(12) United States Patent
Le Quere (10) Patent No.: US 7,437,569 B2
(45) Date of Patent: Oct. 14, 2008

(54) MODULE FOR SECURE MANAGEMENT OF DIGITAL DATE BY ENCRYPTION/DECRYPTION AND/OR SIGNATURE/VERIFICATION OF SIGNATURE WHICH CAN BE USED FOR DEDICATED SERVERS

(75) Inventor: Patrick Le Quere, Villebon sur Yvette (FR)

(73) Assignee: Bull, S.A., Louveciennes (FR)

( * ) Notice: Subject to any disclaimer, the term of this patent is extended or adjusted under 35 U.S.C. 154(b) by 663 days.

(21) Appl. No.: 10/329,672

(22) Filed: Dec. 27, 2002

(65) Prior Publication Data
US 2003/0131250 A1 Jul. 10, 2003

(30) Foreign Application Priority Data
Dec. 28, 2001 (FR) .................................. 01 17043

(51) Int. Cl.
*H04L 9/10* (2006.01)
(52) U.S. Cl. ...................................................... 713/189
(58) Field of Classification Search ....................... None
See application file for complete search history.

(56) References Cited

U.S. PATENT DOCUMENTS

| 4,313,160 | A | * | 1/1982 | Kaufman et al. ............... 710/23 |
| 6,028,939 | A | * | 2/2000 | Yin .............................. 713/189 |
| 6,061,449 | A | * | 5/2000 | Candelore et al. ............. 380/28 |
| 6,366,117 | B1 | * | 4/2002 | Pang et al. .................... 326/38 |
| 6,704,871 | B1 | * | 3/2004 | Kaplan et al. ................ 713/192 |
| 7,269,738 | B1 | * | 9/2007 | Kivimaki ..................... 713/189 |

FOREIGN PATENT DOCUMENTS

| WO | WO 00 76119 A | 12/2000 |
| WO | WO 01 05086 A | 1/2001 |
| WO | WO 0105086 A2 * | 1/2001 |
| WO | WO 01 76129 A | 10/2001 |

OTHER PUBLICATIONS

Brilantes F et al: "Methods for Adapting the SCSI Interface for Use with An Encryption Module" Motorola Technical Developments, Motorola Inc. Schauburg, IL, vol. 32, Sep. 1, 1997, pp. 124-127, XP000741157, iISSN: 0887-5286-Entire Document.

* cited by examiner

*Primary Examiner*—Emmanuel L Moise
*Assistant Examiner*—David J Pearson
(74) *Attorney, Agent, or Firm*—Miles & Stockbridge, P.C.; Eric G. King

(57) ABSTRACT

A module for secure management of digital data by encryption/decryption and/or signature/verification of signature which can be used for dedicated servers. The module is controlled by a microprocessor ($\mu P_1$). A working memory (RAM) is associated with the microprocessor and is provided with a common interfacing module. Parallel-connected to this common interfacing module and forming the internal circuits of said module are a plurality of circuits for secure management of data received from or respectively transmitted to the common interfacing module. Each secure management circuit forming an automatic secure management device is equipped with a secure management input/output sub-module connected to the common interfacing module and a specific sub-module for encryption/decryption or respectively for calculation/verification of signature.

22 Claims, 5 Drawing Sheets

General environment/architecture

FIG.1a  General environment/architecture

MODULE FOR SECURE MANAGEMENT OF DIGITAL DATE BY ENCRYPTION/DECRYPTION AND/OR SIGNATURE/VERIFICATION OF SIGNATURE WHICH CAN BE USED FOR DEDICATED SERVERS

FIELD OF THE INVENTION

The invention relates to a module for secure management of digital data by encryption/decryption and/or signature/verification of signature.

BACKGROUND OF THE INVENTION

The processes for secure management of data by encryption/decryption and/or by signature/verification of signature have become crucial nowadays because of the growing increase in the exchanges of data of all kinds, on the one hand, and because of the widespread use of very powerful electronic data processing means which are capable of allowing less scrupulous individuals unauthorised access to data in transit in the network, on the other hand.

In order to face up to the acuteness of the aforementioned problems, the developments of technical solutions nowadays propose cryptographic products provided in the form of integrated circuits, for example of the ASIC type. Each circuit of this type is then produced with a view to an application which is well defined and of which the design is carried out in two stages:
  a first stage consisting of a logic design of the cryptographic product, and
  a second stage, known as routing placement, which is the responsibility of the designer of integrated circuits, and consists of translating the logic functions into physical terms in electronic circuits.

Because of the necessary association of distinct specialisms, the operations for development of the aforementioned integrated circuits of the ASIC type are very costly in time and in resources for development. For this reason such circuits can only be developed on an industrial scale for batches exceeding at least about ten thousand.

Furthermore, due to their nature as dedicated circuits, these latter cannot claim a great flexibility of use, which of course prejudices the possibility of them becoming widespread.

In order to remedy the drawbacks relating to the implementation of the aforementioned integrated circuits, it is necessary simultaneously to satisfy several specific criteria, among them:
  use of programmable technologies in place of the ASIC-type integrated circuits;
  demand for a level of performance comparable to that of the ASIC-type integrated circuits, as regards the level of secure management of the data, the speed of processing and the rate of transmission of the secure data;
  possibility of re-use of cryptography components in distinct environments, particularly within the framework of different types of memory architecture, in order to obtain maximum adaptability or flexibility of use;
  possibility of embedding in these cryptography components original specific, so-called proprietary processes or algorithms for encryption/decryption and/or calculation/verification of signature, without however introducing change into the architecture thereof;
  possibility of simultaneous execution in multitask mode of several processes or algorithms for secure management of data without a decline in the level of performance, whilst permitting the introduction of a diversification of the secure management processes;
  rationalisation and systematisation of secure management processes by constitution of substantially independent secure management blocks.

With regard to the aforementioned criteria, the available solutions which are currently known appear particularly ill-adapted.

A first solution may consist of making use of standard commercially available components. This solution, whilst it has the interesting feature of rapid implementation, does not satisfy the aforementioned criteria. In particular, each cryptography product must, even with the use of the aforementioned standard components, be the subject of specific design and implementation. It must also use different components, in particular in the presence of different and incompatible memory interfacing circuits. In such a situation, finally, there is no real control of the technology for secure management of data because the cryptography components which constitute the core of the cryptography product are purchased from a supplier who, in general, does not communicate all the information relating to his product in order to preserve the supposed inviolability thereof. Equally, the embedding of specific processes or algorithms for secure management of data is not in any way easy, as in such a case such embedding must be carried out on a separate component.

A second solution consists of the implementation of solutions on a case by case basis. If the programmable technologies may appear adapted to this type of solution, the major drawback of such an approach lies in the absence of any possibility of perpetuating the control of the embedding of processes or algorithms for secure management of data for other cases of use, whilst in addition it does enable the development resources to be rationalised since the operation of redefinition and of redesign is very important for each case. For this reason the embedding of proprietary secure management processes or algorithms is all the more costly in design and development services.

SUMMARY OF THE INVENTION

The object of the present invention is to remedy the aforementioned drawbacks of the techniques known in the prior art by the implementation of a module for securing data, by encryption/decryption and/or signature/verification of signature, from a programmable technology of the FPGA (field programmable gate array) type which satisfies all of the specific criteria previously mentioned in the description.

In particular, a further object of the invention is the implementation of modular components for secure management of data which allow a level of performance to be achieved which is equivalent to that provided by the conventional solutions of ASIC-type integrated circuits.

Another object of the invention is likewise the implementation of a module for secure management of data which is capable of being re-used in different architectures or material environments, this secure management module being capable of being embedded on different types of electronic boards in order thus to favour the achievement of substantial economies in development costs.

Another object of the invention is the implementation of a module for secure management of data by encryption/decryption and/or signature/verification of signature permitting the successive or simultaneous implementation of a plurality of automatic secure management devices, at the user's initiative, each automatic secure management device being capable of corresponding to a specific or proprietary, even original process of encryption/decryption and/or of signature/verification of signature.

The module for secure management of data by encryption/decryption and/or signature/verification of signature which is the subject of the present invention is controlled by a microprocessor with which a working memory is associated.

It is remarkable in that it comprises at least one module for common interfacing between the microprocessor and the circuits of the secure management module.

The internal circuits of the secure management module comprise a plurality of secure management circuits which are parallel-connected to the interfacing module and each ensure the encryption/decryption or respectively the calculation/verification of signature in respect of data received from or respectively transmitted to the common interfacing module. Each secure management circuit includes a secure management input/output sub-module interconnected to the interfacing module and a specific sub-module for encryption/decryption or respectively for calculation/verification of signature.

The module for secure management of data which is the subject of the present invention has applications in the implementation of products for secure management of data in the form of electronic boards which can be plugged into the connector (slot) of a microcomputer used as server centre for example, accommodating the very elaborate on-line services or, on the contrary, small data communication services.

DESCRIPTION OF THE DRAWINGS

The technical and functional characteristics of the module for secure management of data by encryption/decryption and/or signature/verification of signature which is the subject of the present invention will be better understood from a reading of the description and a study of the accompanying drawings, in which:

FIG. 2b shows, by way of illustration, the structure of a command block which permits the launching of the execution of any operation of encryption/decryption or respectively of signature/verification of signature by an automatic secure management device, such as is shown in FIG. 2a;

FIG. 3c shows, purely by way of illustration, a generic process for interfacing between the common interfacing module shown in FIG. 3a and the working memory shown in FIG. 1a;

FIG. 4 shows, purely by way of illustration, a non-limiting mode of implementation of a secure management input/output sub-module interconnected to the common interfacing module, as shown in FIG. 3a;

DESCRIPTION OF THE PREFERRED EMBODIMENT(S)

The module for secure management of data by encryption/decryption and/or signature/verification of signature which is the subject of the present invention will now be described in greater detail in connection with FIG. 1a and the following figures.

Figure 1A:
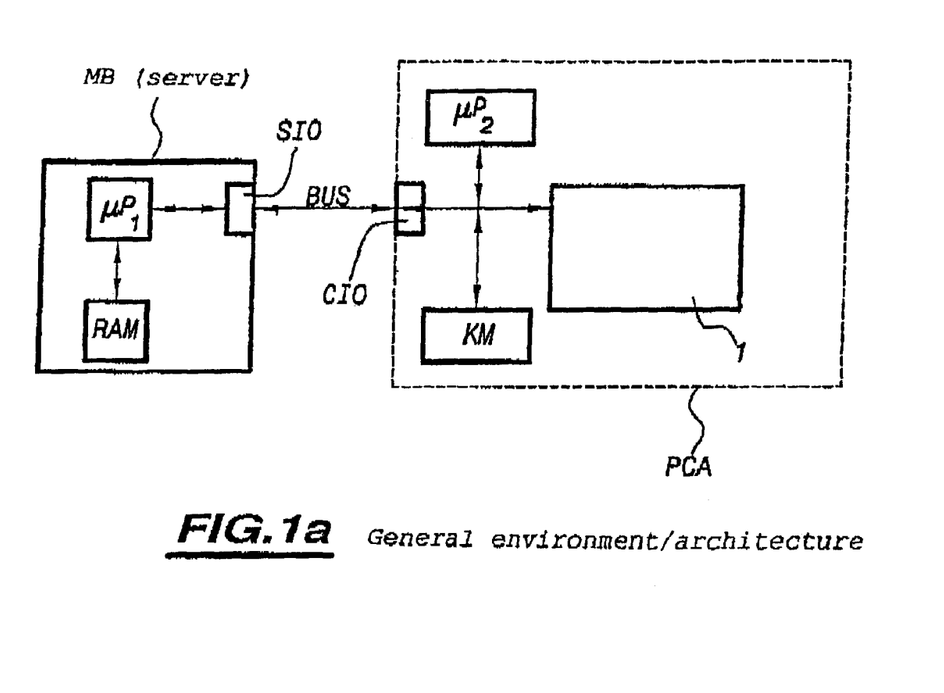
FIG. 1a shows, purely by way of illustration, a specific configuration of an environment which permits the implementation of a module for secure management of data according to the present invention.

In the aforementioned FIG. 1a there is shown, purely by way of illustration, a specific configuration of an environment which permits the implementation of a module for secure management of data according to the present invention.

In general terms it may be pointed out that the concept of secure management of data relates on the one hand to the operations of encryption/decryption of digital data as well as the processes of calculation or respectively of verification of signature of these data and their authentication.

More specifically, it may pointed out that the aforementioned processes of encryption/decryption and of calculation of signature/verification of signature relate to processes or symmetric key algorithms or asymmetric key algorithms, the symmetric key encryption algorithms involving the use of one single secret key for carrying out the operations of encryption/decryption and/or calculation or signature or respectively verification of signature, and the asymmetric key algorithms or processes involving the use of a public key and a private key, whereby the private key is kept secret and the public key can be circulated for example.

With reference to FIG. 1a, it may be pointed out that the module for secure management of data which is the subject of the present invention is used within the framework of a cryptography product in the form of a board with cryptographic function designated by PCA in FIG. 1a, this board comprising as shown in the aforementioned figure, a microprocessor or microcontroller $\mu P_2$ and a key memory denoted by KM. The module for secure management of data 1 is interconnected to the microprocessor and to the key memory KM via a bus connection, the assembly being connected to an input/output connector denoted by CIO. The board with cryptographic function which is thus formed is intended to be introduced into a slot-type connection denoted by SIO which is provided in the motherboard MB of a computer, such as a server for example, this computer having a microprocessor $\mu P_1$ and a working memory RAM. Thus FIG. 1a shows the assembly of the board with cryptographic function PCA and the motherboard MB connected via a bus connection, such as a PCI bus for example.

With reference to the same FIG. 1a, it may be pointed out that the module for secure management of data 1 is controlled by a microprocessor, the microprocessor $\mu P_1$, with which the working memory RAM of the host computer comprising the motherboard MB is associated. Thus it will be understood that the controlling microprocessor $\mu P_1$ and the working memory RAM are external to the module 1 for secure management of data which is the subject of the present invention.

This latter will now be described in connection with FIG. 1b.

As shown in the aforementioned figure, the module for secure management of data which is the subject of the present invention comprises at least one module 10 for common interfacing between the microprocessor $\mu P_1$ and the internal circuits of the secure management module, the object of this common interfacing module being essentially to manage the data inputs/outputs between the module for secure management of data 1 and the aforementioned internal circuits.

Figure 1B:
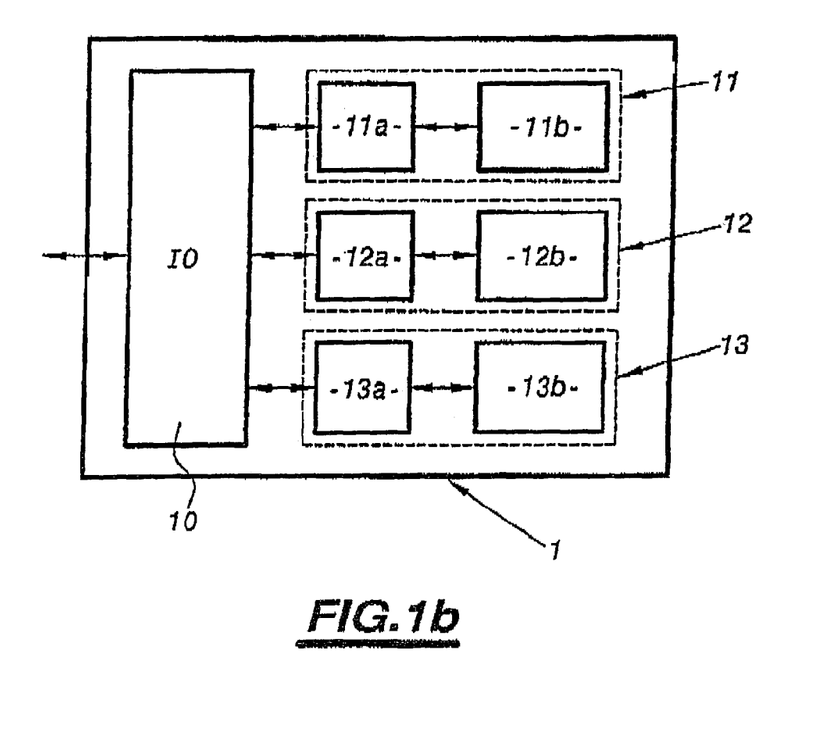
FIG. 1b shows, by way of illustration, a general block diagram of the architecture of a module for secure management of data according to the present invention.

These internal circuits are formed by a plurality of secure management circuits denoted by 11, 12, 13 in FIG. 1b, these secure management circuits being parallel-connected to the interfacing module 10, as shown in the drawing.

Each of the secure management circuits makes it possible to ensure the encryption/decryption or respectively the calculation/verification of signature in respect of data received from or respectively transmitted to the common interfacing module 10.

As also shown in FIG. 1b, each secure management circuit includes a secure management input/output sub-module bearing the reference a interconnected to the interfacing module 10 and a specific module for encryption/decryption or respectively for calculation/verification of signature bearing the reference b. Thus the secure management input/output sub-modules are referenced 11a, 12a and 13a and the specific sub-modules for encryption/decryption or respectively for calculation/verification of signature are referenced 11b, 12b and 13b in the aforementioned FIG. 1b.

With reference to FIG. 1b, it will be understood that each secure management circuit is put into operation by the following mechanisms:

definition of each process or algorithm for encryption/decryption or calculation/verification of signature in two logical blocks: one of the blocks comprising the core of the algorithm which is strictly speaking specific to the latter and corresponding to the blocks 11b, 12b and 13b of FIG. 1b for each of the secure management circuits and the other block being substantially identical for each of the secure management circuits and, in fact, for each of the retained processes or algorithms comprising input/output devices with the external memory and thus bearing the references 11a, 12a and 13a in FIG. 1b.

Each block, that is to say each sub-module 11a, 12a and 13a and respectively 11b, 12b and 13b, is preferably provided with a separate clock in order to permit optimisation of the transfers of data which are to be encrypted or have been encrypted or respectively to be subjected to signature or to verification of signature independently of the type of algorithm used with regard to the input/output sub-module used;

use of a common block for interfacing to the assembly of external memories, that is to say the memory RAM of the previously mentioned host computer, permitting each process or algorithm for secure management of data to function without knowledge of the type of memory external to the module for secure management of data which is the subject of the invention.

As will be observed in FIG. 1b, the secure management circuits 11, 12 and 13 can, as the case may be, be formed by identical secure management circuits, that is to say using not only identical secure management input/output sub-modules but also identical sub-modules for encryption/decryption or respectively for calculation/verification of signature. In such a case, such an architecture makes it possible to ensure parallel processing for secure management of data and consequently to increase the throughput of processed data for a given application for example.

With reference to the same FIG. 1b, by virtue of the parallel architecture retained for each secure management circuit 11, 12, 13, it may be pointed out that each secure management circuit may thus be constituted into an automatic secure management device which operates under the control of the microprocessor $\mu P_1$ by means of the previously mentioned common interfacing module 10.

The aforementioned automatic secure management device operates under the control of the microprocessor in direct memory access mode, and to this end the microprocessor carries out an initialisation of the automatic device by communication of an address in the working memory relating to a command block of the latter, as will be described later in the description.

The operating mode of an automatic secure management device formed by one of the secure management circuits 11, 12 and 13 of FIG. 1b will now be described in connection with FIGS. 2a and 2b.

Figure 2A:
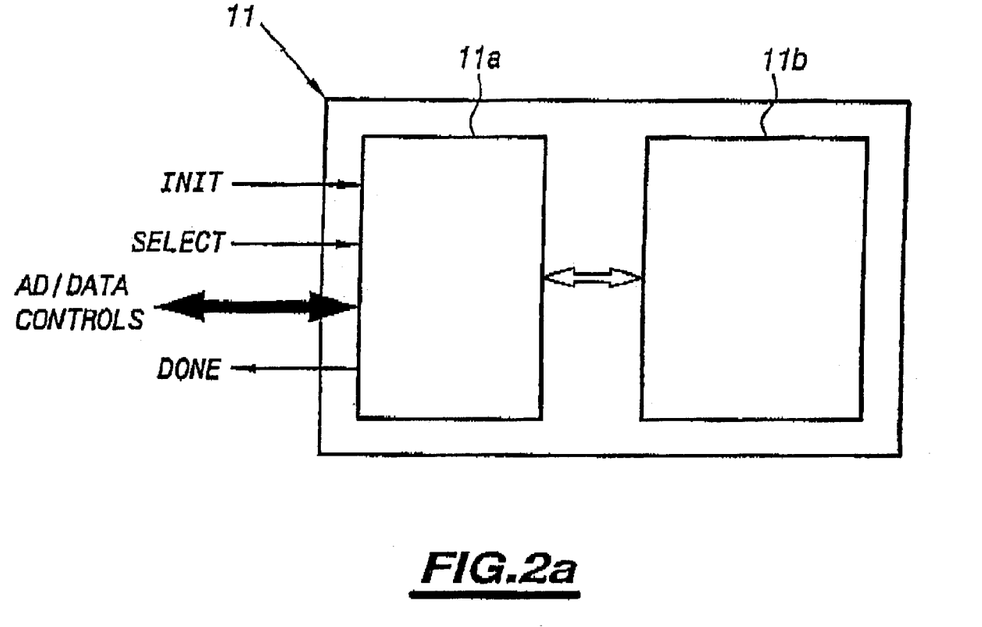
FIG. 2a shows, by way of illustration, a block diagram relating to an automatic device for secure management of data put into effect by means of a module for secure management of data according to the present invention, as shown in FIG. 1b.

More specifically, it may be pointed out with reference to FIG. 2a that the operating mode relating to each automatic secure management device applies to any one of the automatic devices shown in FIG. 1b.

Thus with reference to FIG. 2a it may be pointed out that each automatic device working under the control of a microprocessor, the microprocessor $\mu P_1$, in direct memory access mode, can operate under the following conditions.

Prior to the execution of any control command, a control command being constituted by a command block such as is described below in relation to FIG. 2b, the microprocessor $\mu P_1$ proceeds to initialise the automatic device by communicating to this latter the memory address of the control zone which is intended for it. Such an operation is carried out by means of the despatch of a signal known as an initialisation signal denoted by INIT. The aforementioned initialisation signal includes for example the value of the memory address located in the external working memory in which the command block which is intended for it is memorised.

When the initialisation signal INIT is launched, the value of this latter being positioned at the logic value 1, the corresponding automatic device proceeds to read on the data bus, designated by AD/DATA in FIG. 2a, the value of the memory address relating to the command block which is intended for it.

Such an operation is executed by means, on the one hand, of each secure management input/output sub-module of the corresponding automatic device 11a, 12a and 13a and, on the other hand, the common interfacing module 10.

When this address has been memorised by the automatic device, this latter is then in a position to execute the command corresponding to the aforementioned command block, the corresponding command block having been placed by the microprocessor of the host computer, the microprocessor $\mu P_1$, in the memory zone of which the address corresponds to the aforementioned address in the external working memory RAM.

Figure 2B:
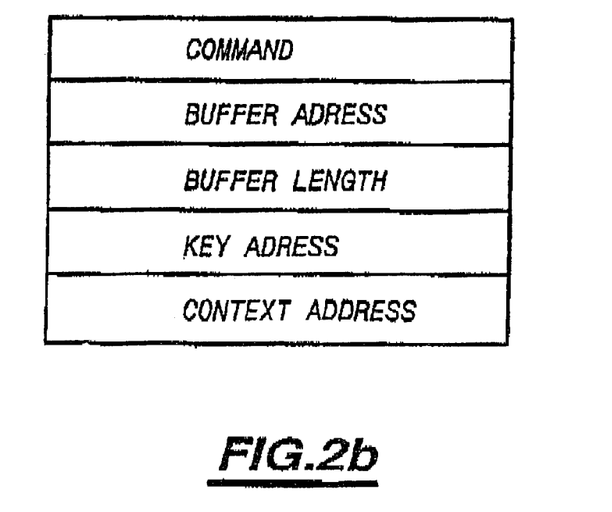

With reference to FIG. 2b, it may be pointed out that the structure of a command block can advantageously be as follows, in such a way as to include a command field called the COMMAND field, a memory address field called the BUFFER ADDRESS field, a field for the length of the memory zone in question called the BUFFER LENGTH field, a key address field called the KEY ADDRESS field and a context address field called the CONTEXT ADDRESS field, which will be explained in more detail below.

The command field is specific to the process or algorithm for encryption/decryption or respectively for signature/verification of signature which is used by the automatic device in question. By way of non-limiting example, it will be recalled that for the implementation of automatic secure management devices using symmetric encryption keys the aforementioned algorithms can correspond to the algorithm DES, 3DES or RC4 for example and the authentication algorithms can correspond to the algorithms SHA or MD5 for example. It will be recalled that for the authentication algorithms, that is to say the algorithms for signature and verification of signature of data, these algorithms or processes make it possible to calculate from a hashing function a condensed set of data which is submitted for signature under the conditions which are known as those applying when the aforementioned algorithms are used.

Naturally, and in a particularly advantageous manner, because of the parallel and modular architecture of the module for secure management of data which is the subject of the present invention, it will be recalled that the processes or algorithms for encryption/decryption or respectively for signature/verification of signature which are incorporated into each secure management device can, if necessary, be so-called proprietary algorithms or even, as the case may be, original algorithms.

The command field contains, at minimum, the following information:
  use of a key when this is optional, for example during the use of algorithms such as HMAC-SHA, HMAC-MD5;
  management of a context or not, the notion of context being constituted by all of the pertinent parameters of the algorithm or process used, which must be saved between each command when this latter applies to buffer memory zones still designated BUFFER of concatenated data. This is for example the case when a buffer data memory is too large to processed by one single command and must be split up into a plurality of buffer memory zones of a smaller size. Under these conditions the encryption must resume at the precise location where it was stopped for the preceding buffer memory, even if in the meantime the automatic secure management device has been made to execute a command for a separate buffer memory. The size of the context data depends upon the type of algorithm or process for secure management of data which is used. The following data are given by way of non-limiting example:
  DES/3DES context data=1 word of 64 bits,
  RC4 context data=258 octets (bytes),
  SHA context data=20 octets (bytes),
  MD5 context data=16 octets.

Therefore the commands associated with the aforementioned command block are of the following generic type:
  encryption in the absence of context;
  encryption with saving of a context for the first buffer memory zone;
  encryption with loading of a context for the last buffer memory zone;
  encryption with loading and saving of a context for every intermediate buffer memory zone.

The buffer memory zone address field, called the BUFFER ADDRESS, points to the buffer memory zone for data to be encrypted in the external working memory RAM. Under these conditions the automatic device for secure management of data writes the encrypted data to the same address as the input data and thus proceeds to overwrite the buffer memory zone containing the input data.

The buffer memory length field, called BUFFER LENGTH, contains the size of the buffer memory zone to be encrypted. This size is a maximum of 32 ko.

The key address field, called KEY ADDRESS, contains the address of the key which is used for encryption or authentication. Naturally, the keys for secure management of data are memorised in the key memory KM, as shown in FIG. 1a, this key memory being, in a manner which is known per se, secure, that is to say rendered physically inaccessible from the exterior and non-volatile.

The distinction between the two types of address, data address and key address, can advantageously be made either by means of a fixed bit address or by a supplementary signal generated by means of the common interfacing module 10, in order not to reduce the size of the usable address field, this field being limited to 32 bits when the connection bus is a bus of the PCI type between the board PCA and the motherboard MB.

The context address field, called CONTEXT ADDRESS, contains the address of the memory zone for context data relating to the algorithm or process for encryption or for verification of signature which is used. This address zone can, of course, be situated advantageously in the secure memory corresponding to the key memory KM.

Finally, the buffer memory zone address can, itself, also point to a zone of the aforementioned secure memory in order to permit the automatic secure management device to encrypt or to authenticate the keys which it polls for use.

Figure 2C:
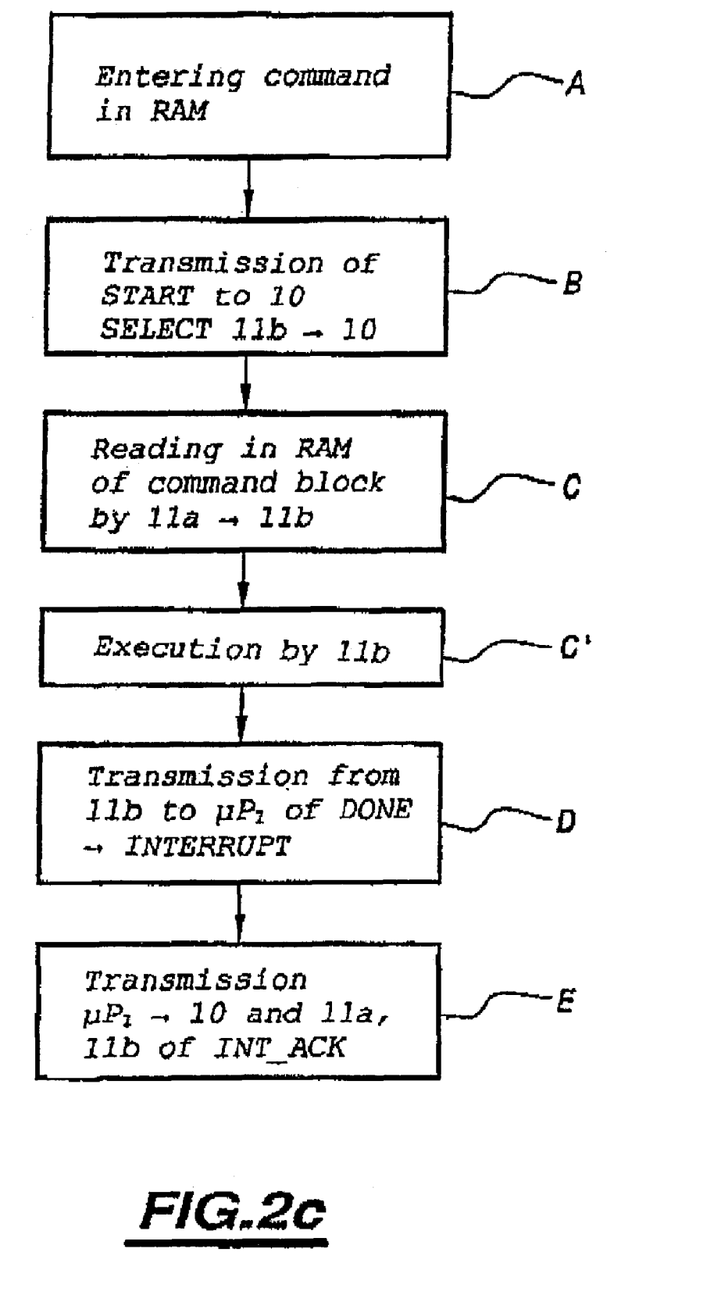
FIG. 2c shows, purely by way of illustration, a succession of steps put into effect.

Taking into account the structure of the command blocks previously described in connection with FIG. 2b, the mechanism for execution of a command is then as follows, according to a successive exchange of messages, as illustrated in FIG. 2c:
  in a step A, entering by the microprocessor $\mu P_1$ of the execute command into the working memory zone allocated to the automatic device;
  in a step B, transmission to the common interfacing module 10 of a start command designated START, making it possible to activate a selection command generated by the automatic device, the selection command SELECT consisting of a command for reading into the working memory of the command zone corresponding to the communicated address in the working memory, this operation being denoted SELECT in step B, the selection command being transmitted by the sub-module 11b to the sub-module 11a and to the common interfacing module 10;
  reading into the working memory of the command block by the secure management input/output module 11a and communication for execution of the command block corresponding to the specific sub-module for encryption/decryption or respectively for calculation/verification of signature 11b at step C;
  step C' of execution of the command block by the specific sub-module 11b;
  at step D, transmission from the specific sub-module 11b to the control microprocessor $\mu P_1$ of an end of execution message DONE permitting generation of an interruption of processing denoted INTERRUPT;
  following the receipt of the message for interruption of processing by the control microprocessor $\mu P_1$, transmission at step E from the microprocessor to the interfacing module and the automatic secure management device 10 and 11a, 11b of a message of acknowledgement of interruption denoted INT_ACK.

In a particularly advantageous embodiment, it may be pointed out that all of the command blocks can be memorised in the form of an API application at the level of the external working memory RAM. Such an embodiment makes it possible, because of the generic nature of the API-type applications, to provide a widely available and standard access to the command blocks, that is to say independently of the host environment and/or material architecture of the PCA board.

Thus with reference to FIG. 2a it will be understood that each automatic secure management device generates command messages to read or respectively to write data in the external working memory RAM. The aforementioned signals, designated AD/DATA/CONTROLS, are specific to the reading/writing in the working memory according to a protocol which will be described later in the description.

In fact, the only direct commands which the control microprocessor $\mu P_1$ addresses directly to each automatic secure management device are the following:

command signal START: this command permits activation of the selection signal SELECT of the automatic device in question in order that the latter may proceed with reading its command zone and execution thereof;

acknowledgement command INT_ACK: this command is used by the control microprocessor $\mu P_1$ in order to acknowledge the interruption of the end of processing, that is to say deactivation of the DONE signal for end of execution.

The aforementioned commands are write commands to defined addresses for each use and result, at the level of the PCA board, in the activation or deactivation of a corresponding signal of the automatic device.

A more detailed description of the common interfacing module 10 will now be given in connection with FIGS. 3a, 3b and 3c.

The common interfacing module 10 has multiple functions and its object is, in particular:

to multiplex all the input/output operations of the processes or algorithms for encryption/decryption or signature/verification of signature to the external working memory RAM whilst defining the implementation of a sufficiently generic interfacing process in order to be able to adapt this latter to all the types of memory or of bus such as PCI, PCMCIA or other bus for example;

to arbitrate between the memory accesses of all the blocks, that is to say of all the automatic devices 11, 12 and 13, in order thus to optimise the pass band of the external transmission bus and finally the throughput of data transmitted by the latter;

to implement a system of command and of interruption of a plurality of command blocks, as will be described below, in order to enable the module for secure management of data according to the invention to be operated in continuous or substantially continuous mode.

Figure 3A:
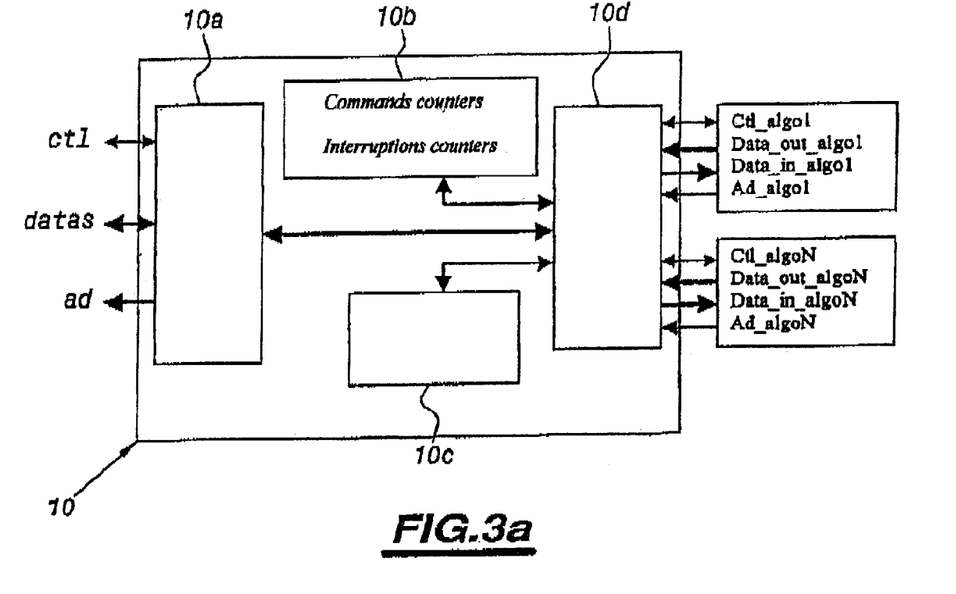
FIG. 3a shows, purely by way of illustration, a non-limiting mode of implementing a common interfacing module which makes it possible to provide a module for secure management of data according to the invention in a preferred manner.

With reference to FIG. 3a, the common interfacing module thus has a memory interface sub-module 10a connected by a bus connection to a secure management interface sub-module 10d which is in direct connection with the input/output and command data generated by each automatic secure management device.

The signals in transit between the common interfacing module 10 and each automatic secure management device are designated by:

Ctl_algo1 designating the command signals of one of the secure management processes designated by algo1;

Data_out_algo1 designating delivered data, that is to say data encrypted by the automatic secure management device using the algorithm algo1;

Data_in_algo1 designating data to be encrypted or to be secured, for example by means of the process or algorithm algo1; and a signal Ad_algo1 relating to an address signal for reading the corresponding command for the implementation of the algorithm or process algo1. The same applies to any automatic secure management device of row between 1 and N.

Although the command operating mode instruction by instruction as described previously in connection with FIGS. 2a to c, is satisfactory, the module for secure management of data which is the subject of the present invention can be optimised in such a way as to obtain operation in so-called continuous mode by virtue of the use of a module for counting commands and interruptions 10b, as show in FIG. 3a in the common interfacing module 10.

The continuous mode of operation permits considerable optimisation of the performance of an automatic secure management device by desynchronising the operation of this latter relative to the control microprocessor $\mu P_1$. This latter is in fact capable of putting into memory a plurality of commands running successively without waiting for the interruptions of the end of operation of the automatic device, which then concatenates the execution of the commands one after the other in substantially continuous mode.

The principle of operation is then as follows: the control microprocessor $\mu P_1$ manages, by means of software, a first commands counter which it increments after each activation of the automatic secure management device and which it decrements each time the interruption of the end of processing is received. The aforementioned software counter enables the control processor to verify that the maximum number of commands send does not exceed a predetermined limiting value, where this value can for example be taken to be equal to 7. An identical counter of the same depth is installed in the common interfacing module 10 at the level of a module for counting commands and for counting interruptions 10b and bears the reference $10b_1$ in FIG. 3b. The commands counter $10b_1$ is incremented each time the START command issued by the control microcomputer $\mu P_1$ is received. This counter is also decremented with each activation of the DONE signal, that is to say the signal of the end of execution of the command in question. As the counter $10b_1$ has not reached the value zero, the selection signal SELECT intended for the relevant automatic device is rendered active.

A second counter, an interruptions counter bearing the reference $10b_2$, is equally provided in the module 10b of the common interfacing module 10. The second counter, the interruptions counter, is incremented by the end of execution signal DONE and decremented by the command for acknowledgement of interruption INT_ACK coming from the control microprocessor $\mu P_1$. As the value of the second counter, the interruptions counter $10b_2$, is not zero, the interruptions signal INT is rendered active and an interruption is sent to the control microprocessor $\mu P_1$.

Finally, a third counter, not shown in the drawings, which plays the role of a commands pointer, can be put into operation by means of software by the control microprocessor $\mu P_1$ and in the form of a component in the secure management input/output sub-module 11a, 12, 13a of each automatic secure management device, and this third counter can be incremented by a value equal to the size of the command after each transmission of a command.

As mentioned previously in the description, the maximum number of commands which can be implemented successively can be fixed for the PCA boards and can be taken to be equal to 7 for example.

Figure 3B:
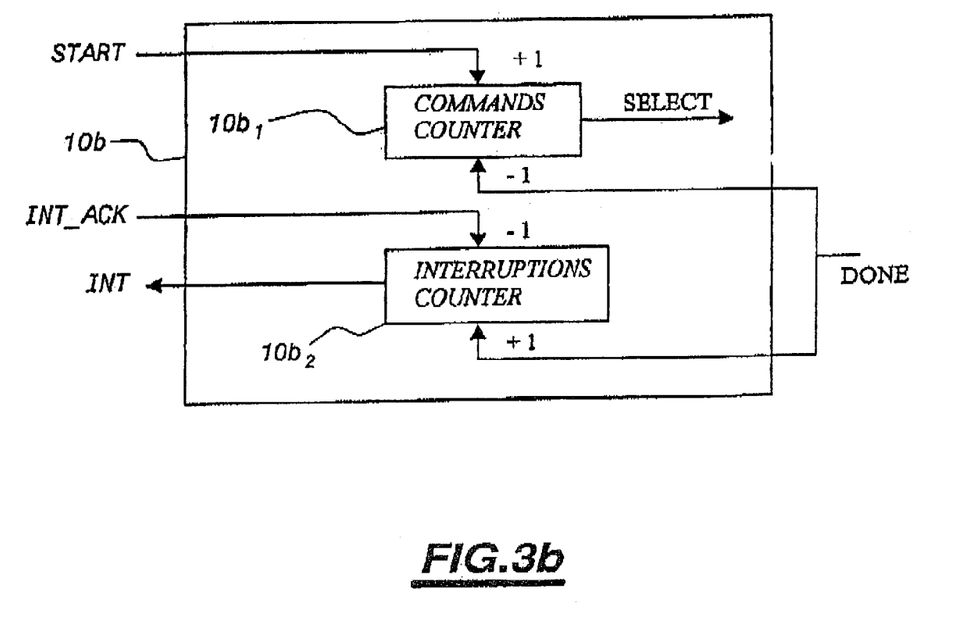
FIG. 3b shows, purely by way of illustration, a detail of the creation of the module for counting commands and interruptions which is incorporated into the common interfacing module shown in FIG. 3a and permits the implementation of a substantially continuous operation of the module for secure management of data which is the subject of the present invention.
Figure 3C:
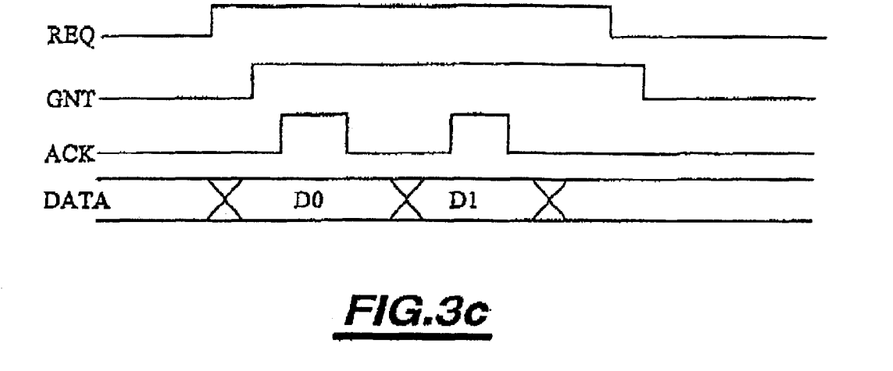

With reference to FIG. 3b, the chronology of the operations can then be as follows:

the control microprocessor $\mu P_1$ verifies that the commands counter corresponding to that of the relevant automatic device is not full, whereby the counting value must be less than 8 for this command at the maximum;

the control microprocessor $\mu P_1$ then writes a block of commands in the memory at the address contained in its commands pointer;

the control microprocessor $\mu P_1$ increments this pointer by the value corresponding to the size of the command;

the control microprocessor $\mu P_1$ then increments its internal commands counter;

the control microprocessor $\mu P_1$ writes to the address corresponding to the START command. The size and the value written can be any ones whatsoever. This command has the effect of incrementing the internal commands counter of the automatic device. As the counter does not reach the value zero, the automatic secure management device processes commands, the selection signal SELECT being activated;

the automatic device reads the commands block and increments its commands pointer as a consequence;

the automatic device processes the corresponding command, then activates its end of execution signal DONE. This activation has the effect of incrementing the internal interruptions counter of the relevant automatic secure management device and of decrementing the internal commands counter. As the interruptions counter does not reach a counting value of zero, an interruption is sent to the control microprocessor $\mu P_1$. As the commands counter does not reach a counting value of zero, the automatic secure management device polls the following command;

the control microprocessor $\mu P_1$, restarted by the aforementioned interruption, then proceeds to the decrementation of its own commands counter;

the processor acknowledges the interruption by writing to the address corresponding to the interruption acknowledgement command INT_ACK. This command has the effect of decrementing the interruptions counter of the automatic secure management device.

It will be understood furthermore that the module for counting commands and for counting interruptions 10b which is shown in FIG. 3a is optional. In fact, such a module is not necessary when the use does not require the processing of commands in continuous mode. This is the case in particular when the system is used with a low throughput for example. As mentioned previously in the description, it permits a significant increase in performance and, especially, equalising of the value of the throughput of encrypted data transmitted or submitted for signature/verification of signature to an optimal value close to the maximum value permitted by the processes or algorithms for secure management of data.

The common interfacing module as shown in FIG. 3 also includes a module 10c for arbitrating the access priorities of the different automatic devices to the external working memory RAM. The priority mode chosen can be the rolling priority mode. Under these conditions, each requesting automatic secure management device is granted access to the working memory RAM in order to carry out a transfer of data of 16 words of 32 bits at the maximum. For this reason all the algorithms and/or processes for secure management of data can access the memory in turns without loss of performance and in the absence of any blockage. Other arbitration processes can be chosen.

With regard to the module for interfacing to the working memory 10a, the role of this module is to multiplex the signals of the input/output parts of the processes or algorithms for secure management of data and, in particular, the controls of addresses and of data to the memory interface. The type of multiplexing is a function of the performance and of the number of automatic secure management devices connected. It is possible to agree on a simple multiplexing for throughputs of the order of 100 Mbits per second per automatic device or, on the contrary, more complex sequential multiplexing for higher throughputs.

Finally, with regard to the memory interface module 10a, that is to say for interfacing to the external working memory RAM, it may be pointed out that such an interfacing module can comprise the implementation of the following signals:

a request signal REQ, this signal being activated in order to initialise a transfer of data in read or write mode with the external working memory RAM;

a memory bus allocation signal, signal GNT for GRANT, this signal having the effect of tuning the memory bus to the module for secure management of data which is the subject of the present invention. This signal can precede or be activated after a request signal;

an acknowledgement signal ACK, this signal being activated by the external memory controller upon each effective read or write of a data word of 32 bits;

a signal indicating a write cycle, signal WR, this signal being positioned by the module for secure management of data which is the subject of the present invention. An example of synchronisation of the aforementioned signals is shown, by way of non-limiting illustration, in FIG. 3c.

Such an interfacing module enables all types of synchronous or asynchronous memory to be supported, as well as the standard buses, such as PCI buses previously mentioned in the description.

A more detailed description of a secure management input/output sub-module, such as a sub-module 11a, 12a or 13a of FIG. 1b, will now be given in connection with FIG. 4.

Each aforementioned sub-module in fact carries out all the input/output operations which are essential for the execution of any process or algorithm for encryption/decryption or respectively of signature/verification of signature of data from the specific corresponding sub-module.

More specifically, each secure management input/output sub-module can include, in a non-limiting manner with reference to the sub-module 11a for example, an interfacing circuit 110 connected to the common interfacing module 10, a FIFO memory 113 for sending data which is interconnected to the interfacing circuit 110 and to the sub-module for encryption/decryption or respectively for calculation/verification of signature 11b. The FIFO memory 113 permits the writing of data in the aforementioned module 11b.

Furthermore, a FIFO memory for receiving data 113 is provided which is interconnected to the interfacing circuit 110 and to the sub-module for encryption/decryption or respectively calculation/verification of signature 11b. The FIFO memory 114 for receiving data permits the reading of data in the aforementioned sub-module 11b.

A command module 111 for the FIFO memories is provided in order to permit the command of transmission and of reception of the data by these latter.

Finally, a direct memory access control module 112 is interconnected at input and at output to the interfacing circuit 110 previously mentioned.

In order to carry out data input/output operations, the secure management input/output module 11a executes, following the activation of the aforementioned selection signal SELECT:

- reading in external working memory RAM of the block of commands to be executed;
- initialisation of the direct memory access control module 112 from parameters contained in the previously mentioned block of commands, after reading of this latter;
- reading in key memory KM of the keys for secure management of data and/or of the context of secure management of data applied by the relevant automatic secure management device and, in particular, by the specific sub-module 11b relating to this latter;
- reading in external working memory RAM of the data to be managed securely and a transmission of these data to the specific sub-module for encryption/decryption or respectively for calculation/verification of signature;
- writing in external working memory RAM of the secure data transmitted by the specific sub-module 11b previously mentioned.

With regard to the direct memory access control module 112, this can advantageously comprise an input addresses counter, that is to say from memory to automatic secure management device, and an output addresses counter, from automatic secure management device to working memory, over 30 bits initialised with the address of the buffer memory zone of data at the moment of reading the command. The first input addresses counter is incremented with each read of a word in memory and the second with each write.

A length of input counter is a counter of the lengths of output data over 30 bits initialised with the length of the buffer memory zone of data BUFF LENGTH at the moment of reading the command. The first counter is decremented with each read of a word in memory and the second with each write. The operation of the automatic secure management device is terminated when the last word of the buffer memory zone is written in memory. This condition generates the signal of end of execution DONE indicating the end of processing of the relevant command.

With regard more specifically to the mode of operation of the FIFO memories 113 and 114 for sending and receiving data, it may be pointed out that these latter play a dual role:

- to dissociate the operation of the core of the automatic secure management device, that is to say the specific secure management sub-module, from the secure management input/output sub-module part, in order that each part can work at its own speed as a function only of the constraints of the internal process.

Figure 4:
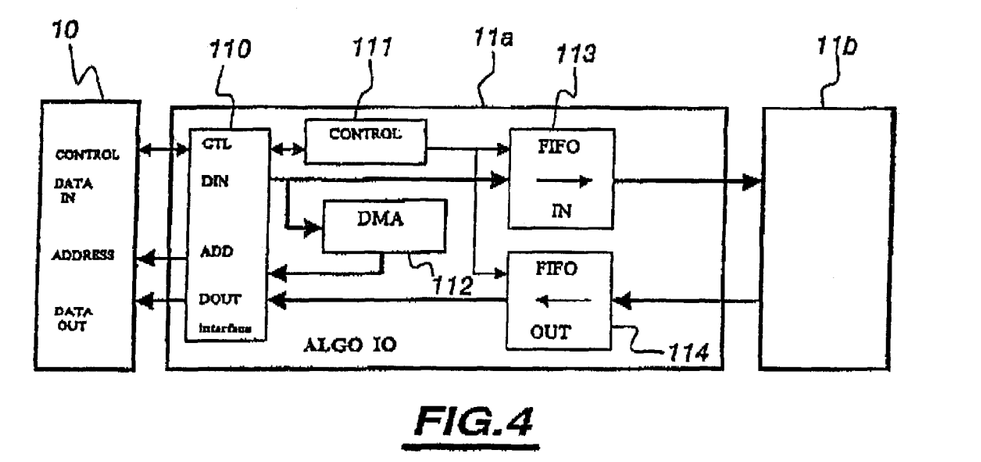

The two clock domains are then separate, each sub-module, module 11a and module 11b in FIG. 4, for example, preferably having an internal clock which is its own.

Thus the sub-module 11a can work at the same frequency for all the processes or algorithms for secure management of data which are implemented by the specific sub-module for encryption/decryption or respectively for calculation/verification of signature 11b for example. This frequency may be chosen to be equal to the frequency of the bus of the PCA board, that is to say 33 MHz for all of the PCA boards for example. By contrast, the clock frequency of any sub-module, such as the secure management sub-module 11b, can then work at a maximum permitted frequency taking into account the technology utilised for each of the aforementioned sub-modules.

- to supply to each specific sub-module 11b, for example for encryption/decryption or respectively for calculation/verification of signature, a stream of data clocked at a satisfactory speed and, in the most continuous manner possible, independently of the types of external memory and of the variable access time. In general, for the utilisation of the FIFO memories 113 and 114, FIFO memories with a depth of 64 words of 32 bits will be used.

With regard to the interfacing circuit 110, this latter has the object of ensuring the exchange of non-encrypted or respectively encrypted data between the FIFO memories 113 for sending and respectively 114 for receiving and the external working memory RAM.

The protocol for access to the external memory RAM depends, of course, upon the type of memory of which this latter consists, such as a SDRAM memory, DPRAM memory or PCI bus. For this reason the protocol for access to the external memory is advantageously utilised and preferably installed in the common interfacing module 10. The interfacing circuit 110, which is a component of an interfacing circuit of the automatic secure management device in question, implements a generic protocol of the type of request REQ/allocation GNT for GRANT/acknowledgement ACK which is substantially identical for all the automatic secure management devices and independent of the type of external memory with which the motherboard MB is equipped.

When the interfacing circuit 110, or more specifically the specific secure management input/output sub-module 11a for example, wishes to proceed to read or write to the external memory RAM, it submits its request to the common interfacing module 10 by activating a request signal REQ. It simultaneously positions the address of the memory zone which it wishes to reach (this may be the address of its command zone or a buffer memory zone address originating from the direct memory access control module 112 previously mentioned) as well as the length of the transfer requested, a length between 1 and 16 words of 32 bits.

The module for management of the access priority 10c in FIG. 3a then tunes the access to the data bus to each automatic secure management device according to the priority mode chosen, such as the rolling priority mode for example. To this end it proceeds with the activation of the access allocation signal GNT (GRANT). Upon reception of the aforementioned signal, the secure management input/output sub-module 11a and, in particular, the interfacing circuit 110, authorises the read or write of the data in the FIFO memories for input 113 or output 114. The activation by the common interfacing module 10 of an input acknowledgement signal ACK-IN indicates the availability in read mode of a data word. This signal is utilised in order to write from the FIFO memory 113 for sending to the specific sub-module for encryption/decryption or respectively for calculation/verification of signature 11b.

The activation of an output acknowledgement signal ACK_OUT indicates that a data word supplied by the receiving FIFO memory 114 and originating from the specific sub-module 11b has been sent to the memory. The input and output acknowledgement signals ACK_IN and ACK_OUT are used by the direct memory access control 112 to advance these counters of addresses and lengths.

Finally, a more detailed description of elements for utilising specific sub-modules for encryption/decryption or respectively for calculation/verification of signature, such as the sub-modules 11b, 12b and 13b, and in particular their exchanges of data with the input/output sub-modules 11a, 12a and 13a, will now be given in connection with FIG. 5.

In general, it will be recalled that each specific sub-module for encryption/decryption or respectively for calculation/verification of signature functions with its own clock. Under these conditions, several different modes of implementation of one and the same process or algorithm for secure management of data can be carried out for different applications.

The complete separation of the process or algorithm for secure management of data from the corresponding input/output part permits this dual optimisation and also allows cohabitation in one and the same architecture of standard and proprietary, or even original processes or algorithms for secure management of data.

Figure 5:
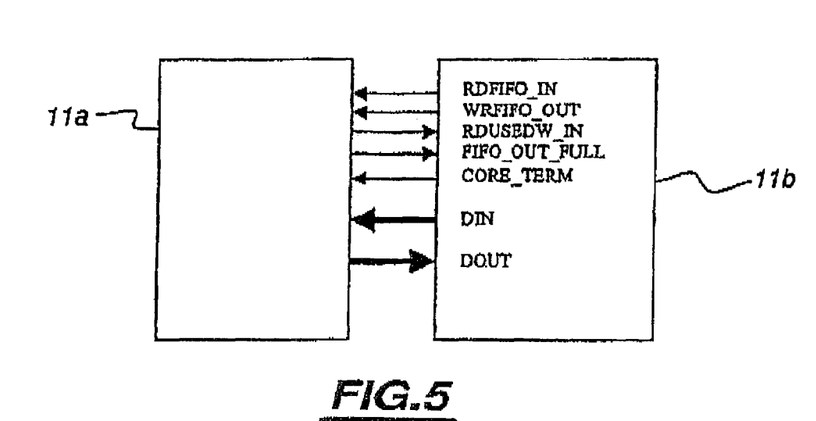
FIG. 5 shows, purely by way of illustration, a block diagram relating to a process of interfacing between a secure management input/output sub-module, such as is shown in FIG. 4, and a specific sub-module for encryption/decryption or respectively for calculation/verification of signature, the assembly of the two aforementioned sub-modules forming a secure management circuit which constitutes an automatic secure management device.

The processes for interfacing between the two sub-modules only requires, in addition to the two FIFO memories 113 and 114 such as are shown in FIG. 4, a simple specific signal designated by CORE_TERM, the function of which is to signal to the secure management input/output modules, such as the module 11a of FIG. 5, the loading of the last encrypted or decrypted words by the corresponding part of the automatic secure management device formed by the specific sub-module 11b.

The aforementioned signalling signal CORE_TERM is, however, useless in the case where the process or algorithm for secure management of data is a simple authentication algorithm which returns a known and fixed number of words corresponding to the implementation of the hashing function previously mentioned in the description and a condensed form of length which is substantially fixed at the end of processing. This is particularly the case when the algorithms SHA and MB5 are used.

In particular, the control signals of the FIFO memories 113 and 114 used by the specific sub-module 11b are for example, as shown in FIG. 5:

for the control of the FIFO memory for sending data 113,
a control signal designated RDUSEDW_IN indicating the number of words contained in the FIFO memory for sending data. This information is used by the sub-module 11b to start its processing when the precise number of words of the command is loaded in the input FIFO memory 113 and, in the course of processing, to go and read the number of data words required by the algorithm for secure management of data which is implemented by the sub-module 11b;
a command signal to read in the sending FIFO memory 113, signal designated RDFIFO_IN. This signal is activated by the sub-module 11b to read a command word or data word from the sending FIFO memory 113;
for the control of the FIFO memory 114 for receiving data,
a command signal for time delay of the output of data of the specific sub-module 11b for encryption/decryption or respectively for calculation/verification of signature, this signal being designated FIFO_OUT_FULL, this time delay being a function of the availability of the FIFO memory for receiving data 114;
a command signal to write a specific data word in the FIFO memory for receiving data 114, this signal being denoted WRFIFO_OUT. This signal is activated by the specific module 11b to write a data word in the FIFO memory for receiving data 114.

Thus a module for secure management of data by encryption/decryption and/or signature/verification of signature has been described which performs particularly well due, on the one hand, to the adaptability and flexibility of use of the different automatic secure management devices which constitute it and, on the other hand, to the levels of performance offered by the throughput and thus the pass band of the connection bus of any component, such as a board of the PCA type, for secure management of data which utilises such a module for secure management. In particular, with regard to the flexibility and adaptability of se of such a module for secure management according to the present invention, it may be pointed out that, because of the parallel architecture of the aforementioned automatic secure management devices, it is possible to effect multiplexing of the buffer memory zones subject to the process of secure management of data, wherein these buffer memory zones can be completely separate, or that by virtue of the use of a process of the multitasking type it is equally possible to proceed with operations of encryption of specific buffer memory zones and signature of these same buffer memory zones successively by embedding the processes of encryption and of signature from algorithms such as the algorithm DES and the algorithm SH-A for example or others.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A computer for secure management of data by encryption/decryption and/or signature/verification of signature, comprising:
   a secure management module for secure management of data by encryption/decryption and/or signature/verification of signature, said secure management module comprising a plurality of internal secure management circuits; and
   a microprocessor for controlling said secure management module;
   a working memory associated with said microprocessor being external to said secure management module;
   wherein the microprocessor is external to the secure management module;
   wherein the working memory is external to the secure management module;
   wherein the microprocessor is configured to store a block of commands in the associated working memory, aid block of commands being operable to configure at least one of the plurality of internal secure management circuits;
   wherein said secure management module further comprises
   an input/output connector adapted to be introduced into a corresponding connector of the computer to connect the secure management module to the microprocessor and to the working memory; and
   a common interfacing module for interfacing between the microprocessor and the plurality of internal secure management circuits of said secure management module, said common interfacing module being connected in parallel to said plurality of internal secure management circuits;
   wherein each said internal secure management circuit is configured for ensuring encryption/decryption or the calculation/verification of signature in respect of data received from or transmitted to said common interfacing module,
   wherein each said internal secure management circuit comprises
   a secure management input/output sub-module interconnected to said common interfacing module,
   a specific sub-module for encryption/decryption or for calculation/verification of signature, and
   a direct memory access module interconnected at an input and at an output to the common interfacing module, wherein the secure management input/output sub-module is configured to read, in the working memory, the block of commands at an address communicated by the microprocessor;

initialize the direct memory access module from first parameters contained in the block of commands;

read, in a memory, from other parameters of the block of commands the keys for secure management of data and/or the context of the secure management of data, to be applied to data by sub-module for encryption/decryption or for calculation/verification of signature in order to obtain secure data;

read, in the working memory, in a direct access mode the data to be managed securely;

transmit the data to be managed securely to the specific sub-module for encryption/decryption or respectively for calculation/verification of signature; and write, in the working memory, in the direct access mode, the secure data transmitted by the specific sub-module for encryption/decryption or respectively for calculation/verification of signature.

2. The computer of claim 1, wherein each said internal secure management circuit is identical for ensuring parallel processing for secure management of the data.

3. The computer of claim 1, wherein each said block of commands includes:

a specific command definition field of the type of process of secure management and activation of the specific sub-module for encryption/decryption of calculation/verification of signature;

a buffer memory address field containing the data to be made secure or respectively secure data;

a buffer memory size field;

an address field for the address of a key for encryption/decryption, calculation/verification of signature; and a context address field, the said context address making it possible to define parameters relating to a called process for secure management of data.

4. The computer of claim 3, wherein all blocks of commands relating to the secure management module are embedded in the form of an application API in said working memory.

5. The computer of claim 1, wherein for execution of a block of commands following initialisation of said secure management module by said microprocessor and storing of said address in the working memory relating to the block of commands of said secure management module, a successive exchange of messages is generated including:

entering an execute command by the microprocessor into the working memory zone allocated to said secure management module;

transmitting a start command to said common interfacing module making it possible to activate a selection command generated by said secure management module, said selection command comprising a command for reading into the working memory of the command zone corresponding to the communicated address in said working memory;

reading in said working memory of said block of commands by the said secure management input/output sub-module interconnected to said common interfacing module and communication for execution of said block of commands to said specific sub-module for encryption/decryption or for calculation/verification of signature, and execution of said command block by the said specific sub-module for encryption/decryption or for calculation/verification of signature;

transmitting from said specific sub-module for encryption/decryption or respectively for calculation/verification of signature to said microprocessor, by means of the secure management input/output sub-module and said common interfacing module, an end of execution message permitting generation of an interruption of processing and following the receipt of this interruption of processing by the microprocessor; and transmitting from the microprocessor to said common interfacing module and said secure management module a message of acknowledgement.

6. The computer of claim 1, wherein said secure management module generates command messages to read or to write data in said working memory.

7. The computer of claim 1, wherein for command of secure management module in a continuous mode, said continuous mode comprises:

a plurality of blocks of commands stored in said working memory; and at least one successive execute command of said plurality of blocks of commands by the said secure management module, independently of the interruptions of the end of operation of the secure management module.

8. The computer of claim 1, wherein each said secure management input/output sub-module includes:

an interfacing circuit connected to said common interfacing module;

a first FIFO memory for sending data interconnected to said interfacing circuit and to said sub-module for encryption/decryption or for calculation/verification of signature, said first FIFO memory for sending data permitting the writing of data in said secure management input/output sub-module;

a second FIFO memory for receiving data interconnected to said interfacing circuit and to said sub-module for encryption/decryption or calculation/verification of signature, said second FIFO memory for receiving data permitting the reading of data in said secure management input/output sub-module;

a command module for the first and second FIFO memories for sending and receiving data; and a direct memory access control module interconnected at an input and at an output to said interfacing circuit.

9. The computer of claim 8, wherein in order to ensure an exchange of data between said secure management input/output sub-module and said specific sub-module for encryption/decryption or for calculation/verification of signature, said secure management input/output sub-module comprises:

a control signal (RDUSEDW_IN) indicating the number of words contained in said first FIFO memory for sending data;

a command signal to read in said first FIFO memory for sending a data word or a command word;

a command signal for time delay of the output of data of the said specific sub-module for encryption/decryption or respectively for calculation/verification of signature as a function of the availability of said second FIFO memory for receiving data; and a command signal to write a data word in said second FIFO memory for receiving data.

10. The computer of claim 8, wherein in order to ensure an exchange of data between said secure management input/output sub-module and said specific sub-module for encryption/decryption or for calculation/verification of signature, said secure management input/output sub-module comprises:

a control signal (RDUSEDW_IN) indicating the number of words contained in said first FIFO memory for sending data;

a command signal to read in said first FIFO memory for sending a data word or a command word;

a command signal for time delay of the output of data of the said specific sub-module for encryption/decryption or respectively for calculation/verification of signature as a function of the availability of said second FIFO memory for receiving data; and a command signal to write a data word in said second FIFO memory for receiving data.

11. The computer of claim 9, further comprising a signaling message which makes it possible, from said specific sub-module for encryption/decryption or for calculation/verification of signature, to indicate to said secure management input/output sub-module the loading of the last encrypted or decrypted word transmitted by said sub-module for encryption/decryption or for calculation/verification of signature.

12. The computer of claim 10, further comprising a signaling message which makes it possible, from said specific sub-module for encryption/decryption or for calculation/verification of signature, to indicate to said secure management input/output sub-module the loading of the last encrypted or decrypted word transmitted by said sub-module for encryption/decryption or respectively for calculation/verification of signature.

13. The computer of claim 1, wherein said common interfacing module comprises:
a first module for multiplexing with the said working memory of data and blocks of commands intended for or emanating from said plurality of internal secure management circuits;
a second module for multiplexing with said plurality of internal secure management circuits said data or blocks of commands intended for or emanating from said plurality of internal secure management circuits, said second multiplexing module being interconnected to said first multiplexing module;
a third module for management of the access priority of each said internal secure management circuit, constituting an automatic secure management device, to said working memory, said management module being interconnected to said second multiplexing module; and
a fourth module for counting commands and interruptions including at least a commands counter and an interruptions counter.

14. The computer of claim 1,
wherein the secure management input/output sub-module operates at a first clock frequency selected to allow the secure management input/output sub-module to supply a stream of data to a corresponding specific sub-module for encryption/decryption and/or calculation/verification of signature to allow the specific sub-module for encryption/decryption and/or calculation/verification of signature to operate at a second clock frequency.

15. A method for secure management of data by encryption/decryption and/or signature/verification of signature, comprising:
providing a secure management module for secure management of data by encryption/decryption and/or signature/verification of signature, said secure management module comprising a plurality of internal secure management circuits;
providing a microprocessor for controlling said secure management module;

providing a working memory associated with said microprocessor external to said secure management module;
providing the microprocessor external to the secure management module;
providing the working memory external to the secure management module;
configuring the microprocessor to store a block of commands in the working memory, said block of commands being operable to configure at least one of the plurality of internal secure management circuits of said secure management module;
providing said secure management module with an input/output connector adapted to be introduced into a corresponding connector of the computer to connect the secure management module to the microprocessor and to the working memory;
providing said secure management module with a common interfacing module for interfacing between the microprocessor and the plurality of internal secure management circuits of said secure management module, said common interfacing module being connected in parallel to said plurality of internal secure management circuits;
providing each said internal secure management circuit for ensuring encryption/decryption or the calculation/verification of signature in respect of data received from or transmitted to said common interfacing module;
providing each said internal secure management circuit with
a secure management input/output sub-module interconnected to said common interfacing module, and
a specific sub-module for encryption/decryption or for calculation/verification of signature; and
a direct memory access module interconnected at an input and at an output to the common interfacing module;
wherein secure management input/output sub-module is configured to
read in the working memory the block of commands at an address communicated by the microprocessor,
initialize the direct memory access module from first parameters contained in the block of commands;
read in a memory from other parameters of the block of commands the keys for secure management of data and/or the context of the secure management of data, to be applied to data by the sub-module for encryption/decryption or for calculation/verification of signature in order to obtain secure data;
read, in the working memory, in a direct memory access mode, the data to be managed securely;
transmit the data to be managed securely to said specific sub-module for encryption/decryption or respectively for calculation/verification of signature; and
write, in the working memory, in the direct access model, the secure data transmitted by the specific sub-module for encryption/decryption or respectively for calculation/verification of signature.

16. A method as set forth in claim 15, further comprising generating a successive exchange of messages including:
entering an execute command by the microprocessor into the working memory zone allocated to said secure management module; and
transmitting a start command for activating a selection command, said selection command consisting of a command for reading into the working memory of a command zone corresponding to the communicated address in said working memory.

17. A method as set forth in claim 16, further including:
transmitting to said microprocessor an end of execution message permitting generation of an interruption of processing; and
transmitting from the microprocessor a message of acknowledgement following the receipt of the end of execution message by the microprocessor.

18. A method as set forth in claim 16, wherein each command block includes:
a specific command definition field of the type of process of secure management and activation of the specific sub-module for encryption/decryption of calculation/verification of signature;
a buffer memory address field containing data to be made secure or secure data;
a buffer memory size field;
an address field for the address of a key for encryption/decryption or calculation/verification of signature; and
a context address field, said context address making it possible to define parameters relating to a called process for secure management of data.

19. A method as set forth in claim 16, further comprising:
generating a command for automatic secure management in continuous mode, said continuous mode initializing a plurality of command blocks stored in the working memory; and
executing at least one successive execute command of said plurality of command blocks independently of the interruptions of the end of operation of the automatic device.

20. The method of claim 15, further comprising:
operating the secure management input/output sub-module at a first clock frequency selected to allow the secure management input/output sub-module;
operating a corresponding specific sub-module for encryption/decryption and/or calculation/verification of signature at a second clock frequency;
wherein the first clock frequency is selected for supplying a stream of data to the corresponding specific sub-module for encryption/decryption and/or calculation/verification of signature based on said first clock frequency.

21. A secure management module for secure management of data by encryption/decryption and/or signature/verification of signature, the secure management module being controlled by an external microprocessor with which an external working memory is associated, the external microprocessor configured to store a block of commands in the external working memory, said block of commands being operable to configure at least one of a plurality of internal secure management circuits of said secure management module, the secure management module further comprising:
an input/output connector adapted to be introduced into a corresponding connector of the computer to connect the secure management module to the microprocessor and to the working memory;
a common interfacing module for interfacing between the microprocessor and the plurality of internal secure management circuits of said secure management module, said common interfacing module being connected in parallel to said plurality of internal secure management circuits;
wherein each said internal secure management circuit is configured for ensuring encryption/decryption or the calculation/verification of signature in respect of data received from or transmitted to said common interfacing module,
wherein each said internal secure management circuit comprises
a secure management input/output sub-module interconnected to said common interfacing module,
a specific sub-module for encryption/decryption or for calculation/verification of signature, and
a direct memory access module interconnected at an input and at an output to the common interfacing module,
wherein the secure management input/output sub-module is configured to
read, in the working memory, the block of commands at an address communicated by the microprocessor;
initialize the direct memory access module from first parameters contained in the block of commands;
read, in a memory, from other parameters of the block of commands the key for secure management of data and/or the context of the secure management of data, to be applied to data by the sub-module for encryption/decryption or for calculation/verification of signature in order to obtain secure data;
read, in the working memory, in a direct access mode the data to be managed securely;
transmit the data to be managed securely to the specific sub-module for encryption/decryption or respectively for calculation/verification of signature; and
write, in the working memory in the direct access mode, the secure data transmitted b the specific sub-module for encryption/decryption or respectively for calculation/verification of signature.

22. The secure management module of claim 21,
wherein the secure management input/output sub-module operates at a first clock frequency selected to allow the secure management input/output sub-module to supply a stream of data to a corresponding specific sub-module for encryption/decryption and/or calculation/verification of signature to allow the specific sub-module for encryption/decryption and/or calculation/verification of signature to operate at a second clock frequency.

* * * * *

UNITED STATES PATENT AND TRADEMARK OFFICE
CERTIFICATE OF CORRECTION

| | |
|---|---|
| PATENT NO. | : 7,437,569 B2 |
| APPLICATION NO. | : 10/329672 |
| DATED | : October 14, 2008 |
| INVENTOR(S) | : Patrick Le Quere |

Page 1 of 1

It is certified that error appears in the above-identified patent and that said Letters Patent is hereby corrected as shown below:

Column 16 – Line 39 – Delete "aid" and replace with "said"

Column 20 – Line 55 – Delete "model" and replace with "mode"

Column 22 – Line 41 – Delete "b" and replace with "by"

Signed and Sealed this

Tenth Day of February, 2009

JOHN DOLL
*Acting Director of the United States Patent and Trademark Office*